United States Patent
Xie et al.

(10) Patent No.: US 8,810,451 B2
(45) Date of Patent: Aug. 19, 2014

(54) COMMUNICATION ANTENNA AUTOMATIC ORIENTATION APPARATUS AND METHOD

(75) Inventors: Weihao Xie, Guangdong Province (CN); Jiahui Zhou, Guangdong Province (CN); Yue Ma, Guangdong Province (CN)

(73) Assignee: ZTE Corporation, Shenzhen, Guangdong (CN)

( * ) Notice: Subject to any disclaimer, the term of this patent is extended or adjusted under 35 U.S.C. 154(b) by 357 days.

(21) Appl. No.: 13/259,319

(22) PCT Filed: May 21, 2009

(86) PCT No.: PCT/CN2009/071892
§ 371 (c)(1),
(2), (4) Date: Nov. 21, 2011

(87) PCT Pub. No.: WO2010/133029
PCT Pub. Date: Nov. 25, 2010

(65) Prior Publication Data
US 2012/0056784 A1    Mar. 8, 2012

(51) Int. Cl.
*H04B 7/00* (2006.01)
*H01Q 3/00* (2006.01)
*H01Q 1/12* (2006.01)
*H01Q 1/28* (2006.01)
*H04W 84/06* (2009.01)

(52) U.S. Cl.
CPC ................. *H01Q 1/28* (2013.01); *H01Q 1/125* (2013.01); *H04W 84/06* (2013.01)
USPC .......................................... 342/367; 342/359

(58) Field of Classification Search
CPC ............... H01Q 3/02; H01Q 3/08; H04B 7/10
USPC ............ 342/75, 359, 367, 424, 427; 343/757, 343/758
See application file for complete search history.

(56) References Cited

U.S. PATENT DOCUMENTS

2006/0264242 A1    11/2006  Dent

FOREIGN PATENT DOCUMENTS

| CN | 1321372 A | 11/2001 |
|----|-----------|---------|
| CN | 1761103 A | 4/2006 |
| CN | 101176367 A | 5/2008 |
| WO | WO9741450 A1 | 11/1997 |
| WO | WO0105062 A1 | 1/2001 |

*Primary Examiner* — Dao Phan
(74) *Attorney, Agent, or Firm* — Scully, Scott, Murphy & Presser, P.C.

(57) ABSTRACT

The present invention discloses a communication antenna automatic orientation apparatus and method, wherein the apparatus comprises: a target base station geographical storage for storing the corresponding relation between the spatial location information on the air lane and the identifier of a target base station; a sensor for confirming current spatial location information of the aircraft; an aircraft spatial orientation sensor for confirming a current spatial orientation of the aircraft; a master controller for confirming a target direction of a directional antenna according to the current spatial location information, the corresponding relation and the current spatial orientation and sending an instruction carrying the target direction; an automatic antenna directional system for receiving the instruction and driving the directional antenna according to the target direction so as to enable the directional antenna to receive a signal from a ground base station in the target direction; a wide aperture antenna for receiving the signal from the ground base station in omnidirection; and a mobile communication terminal for processing the signal received by the wide aperture antenna and the signal received by the directional antenna.

29 Claims, 5 Drawing Sheets

- PRIOR ART -

COMMUNICATION ANTENNA AUTOMATIC ORIENTATION APPARATUS AND METHOD

FIELD OF THE INVENTION

The present invention relates to the communication field and, in particular, to a communication antenna automatic orientation apparatus and method.

BACKGROUND OF THE INVENTION

Figure 1:
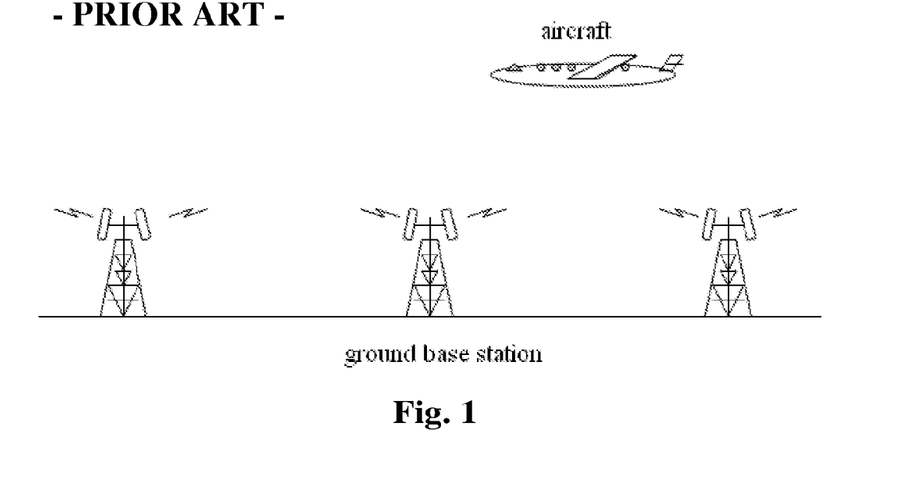
FIG. 1 is a schematic diagram of a ground base station covering an aircraft in relevant art.

In relevant art, the dedicated cellular wireless communication network has already been able to provide service for aircrafts, such that people on the airplane can obtain popularized and economic mobile communication services which include voice service and packet data service. FIG. 1 is a schematic diagram of a ground base station covering an aircraft in relevant art. As shown in FIG. 1, the covering is basically implemented as follows: a certain number of base station networks with the suitable layout are built on the ground, the antennae inclines upwardly to cover a civilian aviation airspace, and the aircrafts are installed with mobile communication terminals and antennae thereof to communicate with the ground base stations.

Currently, the mobile communication terminal antennae installed on the aircrafts generally use wide aperture omnidirectional antennae which has relatively small gain and cannot effectively amplify the signals of the main serving base stations and cannot restrain the interference signals of adjacent base stations. Although according to normative wireless plan design, using omnidirectional antennae can meet basic communication quality requirements, there are still disadvantages in such aspects as the capacity and coverage of the system, especially the limitation on the applications of high speed packet data service is relatively apparent. For example, one of three mainstream technologies of $3^{rd}$ Generation (abbreviated as 3G) communication is code division multiple access (abbreviated as CDMA) 2000 1xEV-DO communication system, in which relatively high data rate proposes relatively high requirements to signal to noise ratio of the forward links, for example, the 2.4 Mbps download rate of the physical layer requires the signal to noise ratio at least greater than 11 dB, and the rate of 921 kbps also requires the signal to noise ratio at least greater than 2 dB. However, in the wide soft handoff area, the signal power of present base station is approximate to or even smaller than the signal total power of an adjacent base station, and the forward signal to noise ratio is often in the range of 0 dB to −3 dB, which can only achieve the rate below several hundreds kbps. Therefore, this antenna type has relatively apparent limitation on the area proportion of the airspace in which high rate can be achieved, and in the soft handoff area with very large area proportion, only the medium and low data rate can achieved.

As aviation users belong to business high-end users, only using omnidirectional antennae with ordinary performance as terminal antennae is a kind of resources waste for the expensive ground network and aviation equipment. In order to remedy the defects of currently aircraft cellular communication technology, there needs a technical solution urgently.

SUMMARY OF THE INVENTION

The present invention is proposed in the view of the problem in relevant art that the mobile communication terminal antennae installed on the aircraft are limited regarding signal quality, capacity and coverage of the system, and the application of high speed packet data service, for this end, the main object of the present invention is to provide a communication antenna automatic orientation apparatus and method so as to solve at least one of the above problems in relevant art.

In order to achieve the above object, a communication antenna automatic orientation apparatus is provided according to one aspect of the present invention.

The communication antenna automatic orientation apparatus according to the present invention comprises: a target base station geographical storage for storing corresponding relation between spatial location information of an aircraft on an air lane and an identifier of a target base station, wherein said spatial location information includes: longitude and latitude, and altitude; a sensor for determining current spatial location information of said aircraft; an aircraft spatial orientation sensor for determining a current spatial orientation of the aircraft; a master controller for determining a target direction of a directional antenna according to said current spatial location information, said corresponding relation, and said current spatial orientation and sending an instruction carrying said target direction; an automatic antenna orientation system for receiving said instruction and driving the directional antenna according to said target direction so as to enable said directional antenna to receive a signal from a ground base station in said target direction; a wide aperture antenna for receiving the signal from the ground base station in omnidirection; and a mobile communication terminal for processing the signal received by said wide aperture antenna and the signal received by said directional antenna.

Preferably, the sensor further comprises: a GPS sensor for determining a current longitude and latitude of said aircraft; and an altitude sensor for determining a current altitude of said aircraft.

Preferably, said target base station geographical storage is further used for storing location information of said target base station.

Preferably, the master controller in particular comprises: an acquiring unit for acquiring the identifier of a target base station corresponding to said current spatial location information according to said corresponding relation and acquiring location information of said target base station according to said identifier, a calculation unit for calculating said target direction according to the location information of said target base station, said current spatial location information and said current spatial orientation; and a sending unit for sending said target direction to said automatic antenna orientation system via a signaling.

Preferably, the automatic antenna orientation system in particular comprises: a driver for driving a directional antenna according to said target direction in said instruction; and said directional antenna for receiving a signal from a ground base station in said target direction.

Preferably, said directional antenna is one of the following: a smart antenna electrically controlling an antenna pattern via an array antenna, and an electromechanical automatic directional antenna.

Preferably, said driver is used for: driving said directional antenna when said directional antenna is said electromechanical automatic directional antenna, and generating an antenna pattern to drive said directional antenna when said directional antenna is said smart antenna.

Preferably, the apparatus further comprises: an antenna housing for preventing said directional antenna and said wide aperture antenna from being affected by wind resistance.

In order to achieve the above object, a communication antenna automatic orientation apparatus is provided according to another aspect of the present invention.

The communication antenna automatic orientation apparatus according to the present invention comprises: a target base station geographical storage for storing corresponding relation between spatial location information of an aircraft on an air lane and an identifier of a target base station, wherein said spatial location information includes: longitude and latitude, and altitude; a sensor for determining current spatial location information of said aircraft; an aircraft spatial orientation sensor for determining a current spatial orientation of the aircraft; a master controller for determining a target direction of a directional antenna according said current spatial location information, said corresponding relation and said current spatial orientation and sending an instruction carrying said target direction; a first automatic antenna orientation system for receiving said instruction and driving a first directional antenna according to said target direction in said instruction so as to enable said first directional antenna to receive a signal from a ground base station in said target direction; a second automatic antenna orientation system for receiving said instruction and driving a second directional antenna according to said target direction in said instruction so as to enable said second directional antenna to receive a signal from a ground base station in said target direction; and a mobile communication terminal for processing the signals received by said first directional antenna and said second directional antenna.

Preferably, the sensor further comprises: a GPS sensor for determining a current longitude and latitude of said aircraft; and an altitude sensor for determining a current altitude of said aircraft.

Preferably, said target base station geographical storage is further used for: storing location information of said target base station.

Preferably, the master controller in particular comprises: an acquiring unit for acquiring the identifier of a current target base station corresponding to said current spatial location information according to said corresponding relation, acquiring location information of said current target base station according to said identifier, and acquiring location information, stored for the last time, of an original target base station; and a judging unit for judging whether the current target base station is the same as said original target base station.

Preferably, the master controller further comprises: a first calculation unit for calculating a first target direction directing to said current target base station and a second target direction directing to said original target base station according to the location information of said current target base station, the location information of said original target base station, said current spatial location information and said current spatial orientation, in the situation that the judgment result of said judging unit is no; a first sending unit for sending a first instruction carrying said first target direction and sending a second instruction carrying said second target direction in the situation that the judgment result of said judging unit is no; and an updating module for updating the storage information of said original target base station with the storage information of said current target base station.

Preferably, the first automatic antenna orientation system in particular comprises: a first driver for driving said first directional antenna according to said first target direction in said first instruction; and said first directional antenna for receiving a signal from said current target base station in said first target direction.

Preferably, the second automatic antenna orientation system in particular comprises: a second driver for driving said second directional antenna according to said second target direction in said second instruction; and said second directional antenna for receiving a signal from said original target base station in said second target direction.

Preferably, the master controller further comprises: a second calculation unit for calculating a target direction directing to said current target base station according to the location information of said current target base station, said current spatial location information and said current spatial orientation, in the situation that the judgment result of said judging unit is yes; and a second sending unit for sending said target direction to said first automatic antenna orientation system and said second automatic antenna orientation system via a signaling in the situation that the judgment result of said judging unit is yes so as to enable both said first directional antenna and said second directional antenna to direct to said current target base station.

Preferably, said first directional antenna or said second directional antenna is one of the following: a smart antenna electrically controlling an antenna pattern via an array antenna and an electromechanical automatic directional antenna.

Preferably, said first driver is used for: driving said first directional antenna when said first directional antenna is said electromechanical automatic directional antenna and generating an antenna pattern to drive said first directional antenna when said first directional antenna is said smart antenna; and said second driver is used for: driving said second directional antenna when said second directional antenna is said electromechanical automatic directional antenna and generating an antenna pattern to drive said second directional antenna when said second directional antenna is said smart antenna.

Preferably, the apparatus further comprises: an antenna housing for preventing said first directional antenna and said second directional antenna from being affected by wind resistance.

In order to achieve the above object, a communication antenna automatic orientation apparatus is provided according to still another aspect of the present invention.

The communication antenna automatic orientation apparatus according to the present invention comprises: a target base station geographical storage for storing corresponding relation between spatial location information of an aircraft on an air lane and an identifier of a target base station, wherein said spatial location information includes: longitude and latitude, and altitude; a sensor for determining current spatial location information of said aircraft; an aircraft spatial orientation sensor for determining a current spatial orientation of the aircraft; a master controller for determining a target direction of a directional antenna according to said current spatial location information, said corresponding relation and said current spatial orientation and sending an instruction carrying said target direction; an electrically controlled beam smart antenna orientation system for receiving said instruction and driving a directional antenna thereof according to said target direction so as to enable said directional antenna to receive a signal from a ground base station in said target direction; and a mobile communication terminal for processing the signal received by said directional antenna.

Preferably, the sensor further comprises: a GPS sensor for determining a current longitude and latitude of said aircraft; and an altitude sensor for determining a current altitude of said aircraft.

Preferably, said target base station geographical storage is further used for: storing location information of said target base station.

Preferably, the master controller in particular comprises: an acquiring unit for acquiring the identifier of a current target base station corresponding to said current spatial location information according to said corresponding relation, acquiring location information of said current target base station according to said identifier, and acquiring location information, stored for the last time, of an original target base station; and a judging unit for judging whether the current target base station is the same as said original target base station.

Preferably, the master controller further comprises: a first calculation unit for calculating a first target direction directing to said current target base station and a second target direction directing to said original target base station according to the location information of said current target base station, the location information of said original target base station, said current spatial location information and said current spatial orientation, in the situation that the judgment result of said judging unit is no; a first sending unit for sending a first instruction carrying said first target direction and sending a second instruction carrying said second target direction in the situation that the judgment result of said judging unit is no; and an updating module for updating the storage information of said original target base station with the storage information of said current target base station.

Preferably, the electrically controlled beam smart antenna orientation system in particular comprises: a driver for driving a first directional antenna according to said first target direction in said first instruction and driving a second directional antenna according to said second target direction in said second instruction; said first directional antenna for receiving a signal from said current target base station in said first target direction; and said second directional antenna for receiving a signal from said original base station in said second target direction.

Preferably, the master controller further comprises: a second calculation unit for calculating a target direction directing to said current target base station according to the location information of said current target base station, said current spatial location information and said current spatial orientation, in the situation that the judgment result of said judging unit is yes; and a second sending unit for sending a signaling carrying said target direction in the situation that the judgment result of said judging unit is yes, so as to enable both said first directional antenna and said second directional antenna to direct to said current target base station.

Preferably, the apparatus further comprises: an antenna housing for preventing said first directional antenna and said second directional antenna from being affected by wind resistance.

In order to achieve the above object, a communication antenna automatic orientation method is provided according to one aspect of the present invention.

The communication antenna automatic orientation method according to the present invention comprises: acquiring from a sensor current spatial location information of an aircraft and current aircraft spatial orientation information, by a master controller; acquiring location information of a current target base station by said master controller according to said current spatial location information; determining by said master controller a target direction of a directional antenna, according to the location information of said current target base station, said current spatial location information and said current aircraft spatial orientation information, and sending a signaling carrying said target direction to a smart directional antenna driver; and driving by said smart directional antenna driver a directional antenna according to said instruction so as to enable said directional antenna to direct to said current target base station.

Preferably, said current spatial location information comprises: longitude and latitude, and altitude.

Preferably, said sensor comprises: a GPS sensor and an altitude sensor.

Preferably, the step of acquiring the location information of said current target base station by said master controller according to said current spatial location information comprises: checking by said master controller a target base station geographical storage according to said current spatial location information to acquire the location information of said current target base station, wherein said target base station geographical storage is used for storing the corresponding relation between the spatial location information of an aircraft on an air lane and an identifier of a target base station.

Preferably, the step of driving a directional antenna by said smart directional antenna driver according to said instruction comprises: directly driving said directional antenna by said smart directional antenna driver when said directional antenna is said electromechanical automatic directional antenna, and generating an antenna pattern by said smart directional antenna driver to drive said directional antenna when said directional antenna is said smart antenna.

Preferably, in the situation that said target base station changes, said method after said master controller acquires the location information of a current target base station according to said current spatial location information, further comprises: judging by said master controller whether said current target base station is the same as the stored original target base station.

Preferably, in the situation that the master controller judges that said current target base station is different from the stored original target base station, the step of said master controller determining a target direction of a directional antenna and sending a signaling carrying said target direction to a smart directional antenna driver comprises: determining by said master controller a first target direction directing to said current target base station and a second target direction directing to said original target base station, according to the location information of said current target base station, the location information of said original target base station, said current spatial location information and said current aircraft spatial orientation information; and said master controller making said first target direction carried in a first signaling and sending the first signaling to a first smart directional antenna driver, and making said second target direction carried in a second signaling and sending the second signaling to a second smart directional antenna driver.

Preferably, the step of driving a directional antenna by said smart directional antenna driver according to said instruction so as to enable said directional antenna to direct to said current target base station comprises: driving by said first smart directional antenna driver a first directional antenna so as to enable said first directional antenna to direct to said current target base station; and driving by said second smart directional antenna driver a second directional antenna so as to enable said second directional antenna to direct to said original target base station.

Preferably, after said smart directional antenna driver drives a directional antenna according to said instruction, said method further comprises: updating by said master controller the storage information of said original target base station with the storage information of said current target base station.

By way of the technical solution of the present invention, the problem in relevant art that the mobile communication terminal antennae installed on the aircraft are limited regarding signal quality, capacity and coverage of the system, and the application of high speed packet data service is solved by proposing a communication antenna automatic orientation apparatus and method suitable for aircrafts to cooperate with the cellular mobile communication systems consisted of ground stations to operate, which can improve user communication quality, improve service data rate and system capacity, and also can enlarge the coverage radius of the ground base station and at the same time ensure the reliability of the handoff between service areas.

Other features and advantages of the present invention will be described in the following description and partly become obvious from the description, or be understood by implementing the present invention. The objects and other advantages of the present invention can be realized and obtained through the structures specially indicated by the description, claims and drawings.

BRIEF DESCRIPTION OF THE ACCOMPANYING DRAWINGS

The drawings herein are used to provide a further understanding of the present invention and form a part of the specification, which are used to explain the present invention together with the embodiments of the present invention without unduly limiting the scope of the present invention. In the drawings.

DETAILED DESCRIPTION OF THE EMBODIMENTS

Brief Description on Functions

In relevant art, high performance directional antenna is applied in the aircrafts so as to improve cellular mobile communication quality and system throughput/capacity, which complies with the requirements of market development and also is a trend of technology development. However, when high performance directional antenna is applied in the aircrafts, the following problems must be solved:

1. when an aircraft is flying, the geographical location thereof changes all the time and may cross the coverage range of a plurality of base stations, and the directional antenna must continuously direct to the best serving base station automatically and accurately;

2. if the smart antenna is required to be able to search the strongest serving base station direction on the ground automatically and rapidly, which of course is the most ideal solution, however, the required search angle range is very large, the horizontal plane is 360 degree and the vertical plane is approximate to 180 degree, which is approximate to a hemisphere, and the current stage of civilian communication technology still cannot reach this level, and in the foreseeable future, its implementation difficulty is still very huge due to the limitation of research costs and device volume;

3. when crossing the coverage borders of different base stations, the direction of the directional antenna will be switched, and the quality of communication links must be ensured and communication interruption should not occur during the handoff; and 4. the antenna is installed outer side of the bottom of the aircraft and unhindered, and at the same time, it must comply with the aviation technology requirements, and such problems as aviation wind resistance, application costs should be taken into account, the volume should be as small as possible and the appearance should be designed to reduce the wind resistance.

For this end, the present invention proposes a communication antenna automatic orientation apparatus, and the components of the apparatus have three modes, one of which can be selected, and this apparatus mainly comprises: a master controller, a best serving base station geographical storage, a GPS sensor, an aircraft spatial orientation sensor, a set of automatic antenna orientation system (including a driver and a directional antenna), a set of wide aperture antennae, or another set of automatic antenna orientation system (including a driver and a directional antenna), or an electrically controlled beam smart antenna orientation system (including a driver and a directional antenna), and a streamline antenna housing. The above various sensors, best serving base station geographical storage, automatic directional antenna driver, etc. contact with the master controller via communication lines, and the directional antenna or wide aperture antenna contacts with the communication terminals via radio frequency cables.

The data of the best serving base station geographical storage can be obtained by operation of a cellular communication network simulation software and can be also modified according to the aviation test data. In addition, the best serving base station geographical storage stores an identifier of the best ground serving base station corresponding to the particular longitude and latitude and altitude on the air lane, and stores the geographical information of a ground base station (target base station). The GPS sensor, altitude sensor, and carrier spatial orientation sensor are devices shared with the aircraft and provide input values (such as, longitude and latitude, altitude, aircraft spatial orientation) for calculating antenna target direction. The automatic directional antenna can be a conventional electromechanical automatic directional antenna, and can also be an emerging smart antenna electrically controlling an antenna pattern via an array antenna. The streamline antenna housing is used for preventing the antenna from being affected by the wind resistance, and the selection of material is required to cause very little damage to the radio frequency signals.

The preferred embodiments of the invention will be described in conjunction with the accompanying drawings, and it shall be understood that the preferred embodiments described here are only for the purpose of illustration and not to limit the present invention.

For the purpose of explanation, several specific details are described in the description below to offer a thorough understanding of the present invention. However, it is apparent that the present invention can also be achieved even without these certain details, and moreover, the following embodiments and the details of these embodiments can be combined in various ways without departing from the spirit and scope interpreted by the appended claims.

Apparatus Embodiment I

Figure 2:
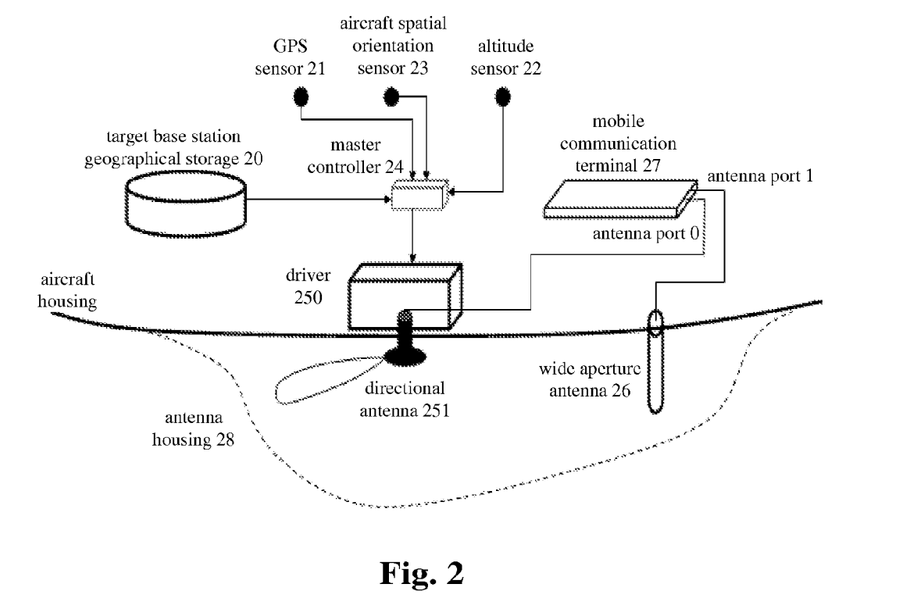
FIG. 2 is a schematic diagram of a communication antenna automatic orientation apparatus according to apparatus embodiment I of the present invention.

A communication antenna automatic orientation apparatus is provided according to the embodiments of the present invention, and FIG. 2 is a schematic diagram of a communication antenna automatic orientation apparatus according to apparatus embodiment I of the present invention, and as shown in FIG. 2, the communication antenna automatic orientation apparatus according to the embodiments of the present invention comprises: a target base station geographical storage 20 (i.e. the above best serving base station geographical storage), a sensor (including a GPS sensor 21 and an altitude sensor 22), an aircraft spatial orientation sensor 23, a master controller 24, an automatic antenna orientation system (not shown) (including a smart directional antenna driver 250 and a directional antenna 251), a wide aperture antenna 26, a mobile communication terminal 27 and an antenna housing 28. The communication antenna automatic orientation apparatus according to the embodiments of the present invention will be described in the following.

The target base station geographical storage 20 is used for storing the corresponding relation between the spatial location information of an aircraft on an air lane and an identifier of a target base station (i.e. the above best ground serving base station), and can also store location information of the target base station, wherein the spatial location information includes: longitude and latitude, and altitude.

In order to judge the besting service base station of the spatial geographical location, there already exists a network simulation software in relevant art, a ray tracing model which is suitable for line-of-sight propagation can be used to improve the accuracy of the simulation result and output a geographical distribution map of the best serving base station. Therefore, the data of the target base station geographical storage 20 can be obtained by the operation of the cellular communication network simulation software.

The sensor which is used for determining the current spatial location information of the aircraft includes a GPS sensor 21 and an altitude sensor 22, wherein, the GPS sensor 21 is used for determining a current longitude and latitude of the aircraft; and the altitude sensor 22 is used for determining a current altitude of the aircraft.

The aircraft spatial orientation sensor 23 is used for determining a current spatial orientation of the aircraft;

The master controller 24 is connected to the above GPS sensor 21, altitude sensor 22 and target base station geographical storage 20 via communication lines and is used for determining a target direction of the directional antenna 251 in the automatic antenna orientation system according to the current spatial location information (the current longitude and latitude outputted by the GPS sensor 21 and the current altitude outputted by the altitude sensor 22), the corresponding relation (stored in the target base station geographical storage 20) and the current spatial orientation (outputted by the aircraft spatial orientation sensor 23), and sending an instruction carrying the target direction to the driver 250 in the automatic antenna orientation system.

Preferably, the master controller 24 in particular includes the following several units:

an acquiring unit for acquiring an identifier of a target base station corresponding to the current spatial location information according to the corresponding relation and acquiring location information of the target base station according to the identifier; a calculation unit for calculating the target direction according to the location information of the target base station, the current spatial location information and the current spatial orientation; and a sending unit for sending the target direction to the automatic antenna orientation system via a signaling.

The automatic antenna orientation system, connected to the master controller 24, includes a driver 250 and a directional antenna 251, wherein the driver 250 is used for receiving an instruction sent by the master controller 24 and driving the directional antenna according to the target direction; and the directional antenna 251 is used for receiving a signal from the ground base station in the target direction.

During practical application, the smart antenna products which adaptively adjust the antenna direction are already produced and mainly include two big categories: 1. the early appearing apparatus (i.e. electromechanical automatic directional antenna) electromechanically and automatically adjusting the antenna direction, which smart antenna can use such hardware as gyroscope, microprocessor, servo machine, etc. to cooperate for the process and control; and 2. the latterly appearing smart antenna (i.e. smart antenna electrically controlling antenna pattern via antenna array) generating beams with different directions using antenna array to control the phase difference between antennas. The above two categories of smart antennae have their own advantages and disadvantages; however, they can control the antenna pattern according to instructions to enable them to direct to the target direction.

When the directional antenna 251 is an electromechanical automatic directional antenna, the driver 250 can directly drive the directional antenna; and when the directional antenna is a smart antenna, the driver 250 needs to generate an antenna pattern to drive the directional antenna 251.

The wide aperture antenna 26 is used for receiving the signal from the ground base station in omni-direction(s);

The mobile communication terminal 27 is used for processing the signal received by the wide aperture antenna 26 and the signal received by the directional antenna 251. In relevant art, the mobile communication terminal 27 already has a product which performs receiving by double antennas, which creates condition for ensuring the reliability of the handoff between base station service areas.

The antenna housing 28 is used for preventing the directional antenna and the wide aperture antenna from being affected by wind resistance. The antenna housing 28 can be a streamline antenna housing, and the selection of material is required to cause very little damage to the radio frequency signals.

It needs to be noted that when the target base station needs handoff, the communication antenna automatic orientation apparatus (i.e. the mode of a set of directional antennae plus a set of wide aperture antennae) according to the embodiments of the present invention does not need to perform special control to the handoff. Since the wide aperture antennae are omni-directional antenna, the signals of a plurality of base stations can be simultaneously received, and the difference between the signals of the original base station and those of the new base station received is not large at the border of the base station coverage area, which can ensure the smooth transition of communication links when the directional antennal changes direction.

The above technical solution will now be further described in combination of an example of CDMA2000 1xEV-DO system hereafter. It needs to be noted that the application of the present invention is not limited to the following example.

The 1xEV-DO system is one of three mainstream technology regimes of international 3G cellular mobile communication, and now there already exists a mature network simulation software which is suitable for this system; as long as there is the basic wireless parameter information (including longitude and latitude, antenna type, antenna orientation, antenna height, feeder loss, base station transmission power, etc.) of a ground base station, the geographical distribution map of the best serving base station can be outputted by using a suitable line-of-sight propagation model (such as ray tracing model with relatively high accuracy) and the map can be outputted according to the altitude of the coverage area by layer.

Figure 3:
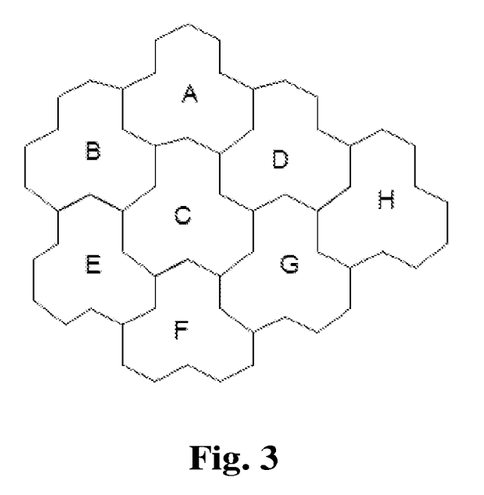
FIG. 3 is a schematic diagram of the range distribution of one certain altitude plane target serving base station according to the embodiments of the present invention.

For example, as shown in FIG. 3, on one certain attitude plane, letters A, B, C, etc. respectively represent a best coverage base station in the covered range, which are ground station A, B, C, etc. respectively. At the base station coverage border, if there are some ping-pong handoff areas in the simulation diagram, then the ping-pong phenomena can be eliminated by performing smooth process by a software technology. If there is real test data of the commonly-used airlines, the simulation result can be modified. The diagram information of these simulation results is converted into the data storage mode, i.e. a best serving base station geographical storage can be formed. For example, the result (each base station control area) of each layer altitude could be converted into a line vector diagram, wherein only several commonly-used aviation altitudes are needed, which proposes relatively small requirements to the storage space.

The ground base station network can remain stable for long time under normal circumstances, and when it changes under special circumstances, it requires to timely check and update the data of the best serving base station geographical storage of the aircraft. In order to make the data updated automatically and make the maintenance simple and convenient, the following mode can be used: during each maintenance period (such as, take one day as a period), after the communication between the aircraft and the ground is started, the computer software first automatically checks whether the version stored and the version of the ground server are consistent, if inconsistent, then downloading and updating are performed; and if the downloading is failed, then the original version is maintained.

GPS information, aircraft spatial orientation and altitude information are basic information for the fly of the aircraft, and relevant sensors are the existing devices of the aircraft and it does not need to newly add a device, as long as relevant output information can be shared by the present apparatus via communication lines.

The master controller can use the microprocessor the technology of which is mature. Inputting the aircraft's current longitude/latitude (Lon x/Lat x) and altitude (High x) transferred by the GPS, calculating the spatial direction angle (horizontal direction angle $\alpha$/vertical direction angle $\beta$) of the aircraft antenna directing to the ground base station using an already mature geospace geometric calculation formula according to the known ground base station antenna longitude/latitude (Lon y/Lat y) and antenna height (High y), if a spatial gyroscope is installed between the aircraft and the directional antenna, then the antenna direction driving parameter is not affected by the change of aircraft spatial orientation, and the calculation result of the spatial direction angle can be used directly; and if there is no spatial gyroscope installed between the aircraft and the directional antenna, then the direction driving parameter of the directional antenna needs to be modified according to the above result and aircraft spatial orientation information (horizontal direction angle $\alpha'$/vertical direction angle $\beta'$), the particular mode of which is addition or subtraction. Thus, the master controller can judge to output a key instruction for the automatic directional antenna according to the above obtained result.

As to smart directional antenna, there are relatively mature electromechanical products and smart beam products, it is key to comply with the characteristics of aviation application, i.e. small volume, light weight, and large change rang of the pattern, and at the same time, the cost is also a factor; comprehensively speaking, the electromechanical driven automatic directional antenna may be more advantageous. The detailed disclosure of automatic directional antenna and driver will not be described, which is not the main content discussed by the present invention.

The wide aperture antenna is an optional composing part of the present invention, and the wide aperture antenna can be an omnidirectional antenna, and it is suggested to employ an antenna which has electrical down-tilting function, which facilitates to improve the effects of receiving signals.

The 1xEV-DO mobile communication terminal has two antenna ports, and it is ok that the signal received by any one of the antennas meets the quality, and the irrelevance between signals of two antennas will also generate diversity receiving gain. This characteristic provides advantages for the present invention to ensure the stability of communication quality and for the solution to solve the handoff of the directional antenna between serving base stations.

The streamline antenna housing, which prevents the wind resistance, requires to achieve low wind resistance, small radio frequency signal loss, volume as small as possible, and being complied with the technical condition of installing the aircraft.

By way of the above process, the forward interference made by the adjacent base station to the communication terminal can be restrained significantly while enhancing the signal of the master serving base station, which is equivalent to achieve that there is only the signal of one master base station in the network coverage range, and this is equivalent to eliminate most of soft handoff areas. By improving the signal to noise ratio of the forward wireless link, the data throughput or subscriber capacity of cellular mobile communication is increased significantly. The above technical solution of the embodiments of the present invention is a solution in which the service performance is improved explicitly by low costs, which has positive promotion function to the development of mobile communication service in the aviation market.

Apparatus Embodiment II

Figure 4:
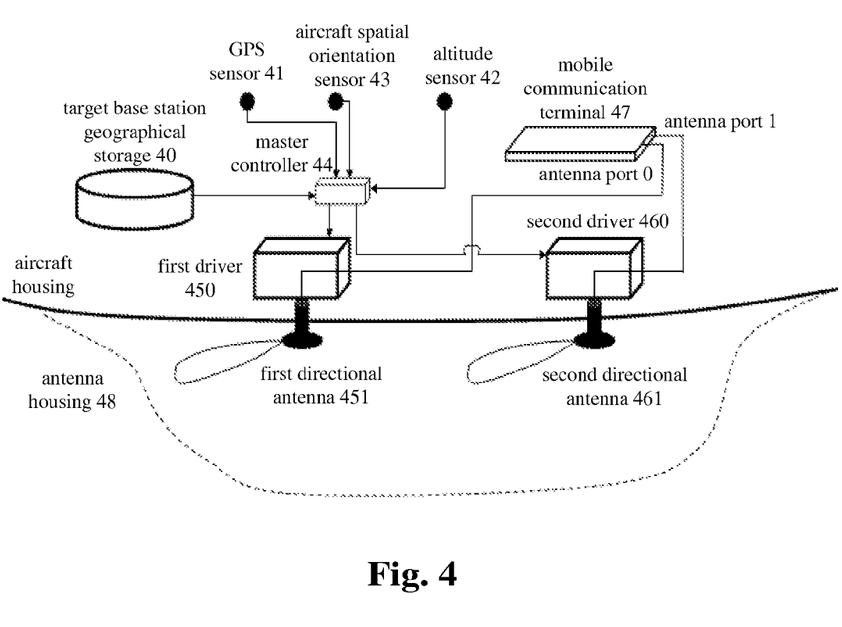
FIG. 4 is a schematic diagram of a communication antenna automatic orientation apparatus according to apparatus embodiment II of the present invention.

A communication antenna automatic orientation apparatus is provided according to the embodiments of the present invention, and FIG. 4 is a schematic diagram of a communication antenna automatic orientation apparatus according to apparatus embodiment II of the present invention, and as shown in FIG. 4, the communication antenna automatic orientation apparatus according to the embodiments of the present invention comprises: a target base station geographical storage 40 (i.e. the above best serving base station geographical storage), a sensor (including a GPS sensor 41 and an altitude sensor 42), an aircraft spatial orientation sensor 43, a master controller 44, a first automatic antenna orientation system (not shown) (including a first driver 450 and a first directional antenna 451), a second automatic antenna orientation system 46 (including a second driver 460 and a second directional antennal 461), a mobile communication terminal 47, and an antenna housing 48. The communication antenna automatic orientation apparatus according to the embodiments of the present invention will be described in the following.

The target base station geographical storage 40 is used for storing the corresponding relation between the spatial location information of an aircraft on an air lane and an identifier of a target base station (i.e. the above best ground serving base station), and can also store location information of the target base station, wherein the spatial information includes: longitude and latitude, and altitude.

The sensor which is used for determining the current spatial location information of the aircraft includes a GPS sensor 41 and an altitude sensor 42, wherein, the GPS sensor 41 is used for determining the current longitude and latitude of the aircraft; and the altitude sensor 42 is used for determining the current altitude of the aircraft.

The aircraft spatial orientation sensor 43 is used for determining a current spatial orientation of the aircraft;

The master controller 44, connected to the above GPS sensor 41, altitude sensor 42 and target base station geographical storage 40 via communication lines, is used for determining a target direction of the directional antenna 451 in the automatic antenna orientation system according to the current spatial location information (the current longitude and latitude outputted by the GPS sensor 41 and the current altitude outputted by the altitude sensor 42), the corresponding relation (stored in the target base station geographical storage 40) and the current spatial orientation (outputted by the aircraft spatial orientation sensor 43), and sending an instruction carrying the target direction to the driver 450 in the automatic antenna orientation system.

Preferably, the master controller 44 can in particular include:

an acquiring unit for acquiring an identifier of a current target base station corresponding to the current spatial location information according to the corresponding relation, acquiring location information of the current target base station according to the identifier, and acquiring location information stored for the last time of an original target base station; and a judging unit for judging whether the current target base station is the same as the original target base station.

According to the judgment result of the judging unit, there can be two situations, i.e. situation I, the current target base station and the original target base station are different; and situation II, the current target base station and the original target base station are the same. Hereinafter, the process of the master controller 44 under the above two situations will be described in detail.

Situation I

Under situation I, the following several units of the master controller 44 can perform the following process:

a first calculation unit for calculating a first target direction directing to the current target base station and a second target direction directing to the original target base station according to the location information of the current target base station, the location information of the original target base station, the current spatial location information and the current spatial orientation in the situation that the judgment result of the judging unit is no;

a first sending unit for sending a first instruction carrying the first target direction and sending a second instruction carrying the second target direction in the situation that the judgment result of the judging unit is no; and an updating module for updating the storage information of the original target base station with the storage information of the current target base station.

Situation II

Under situation II, the following several units of the master controller 44 can perform the following process:

a second calculation unit for calculating a target direction of the current target base station according to the location information of the current target base station, the current spatial location information and the current spatial orientation in the situation that the judgment result of the judging unit is yes; and a second sending unit for sending the target direction to the first automatic antenna orientation system and second automatic antenna orientation system via a signaling in the situation that the judgment result of the judging unit is yes, so as to enable both the first directional antenna and the second directional antenna to direct to the current target base station.

The communication antenna automatic orientation apparatus according to the embodiments of the present invention further comprises:

Situation I

The first automatic antenna orientation system, connected to the master controller 44, includes a first driver 450 and a first directional antenna 451, wherein the first driver 450 is used for receiving an instruction sent by the master controller 44 and driving the first directional antenna 451 according to the target direction in the instruction; and the first directional antenna 451 is used for receiving a signal from the current target base station in the target direction; and the second automatic antenna orientation system 46, connected to the master controller 44, includes a second driver 460 and a second directional antenna 461, wherein the second driver 460 is used for receiving an instruction sent by the master controller 44 and driving the second directional antenna 461 according to the target direction in the instruction; and the second directional antenna 461 is used for receiving a signal from the original target base station in the target direction.

Situation II

Under situation II, the drivers in the first automatic antenna orientation system and second automatic antenna orientation system 46 respectively drive the first directional antenna 451 and the second directional antenna 461 according to the instructions sent by the master controller 44, so as to enable both the first directional antenna 451 and the second directional antenna 461 to direct to the current target base station.

The first directional antenna 451 in the above first automatic antenna directing system or second directional antenna 461 in the second automatic antenna directing system 46 is one of the following: a smart antenna electrically controlling the antenna pattern via the array antenna or an electromechanical automatic directional antenna.

Preferably, the first driver 450 directly drives the first directional antenna 451 when the first directional antenna 451 is an electromechanical automatic directional antenna, and generates an antenna pattern to drive the first directional antenna 451 when the first directional antenna 451 is a smart antenna; and the second driver 460 directly drives the second directional antenna 461 when the second directional antenna 461 is an electromechanical automatic directional antenna, and generates an antenna pattern to drive the second directional antenna 461 when the second directional antenna 461 is a smart antenna.

The mobile communication terminal 47 is used for processing the signals received by the first directional antenna 451 and the second directional antenna 461.

The antenna housing 48 is used for preventing the first directional antenna 451 and the second directional antenna 461 from being affected by wind resistance. The antenna housing 48 can be a streamline antenna housing, and the selection of material is required to cause very little damage to the radio frequency signals.

It needs to be noted that the details in the communication antenna automatic orientation apparatus according to the embodiments of the present invention can refer to the corresponding part in the above apparatus embodiment I, which will not be described here redundantly.

Apparatus Embodiment III

Figure 5:
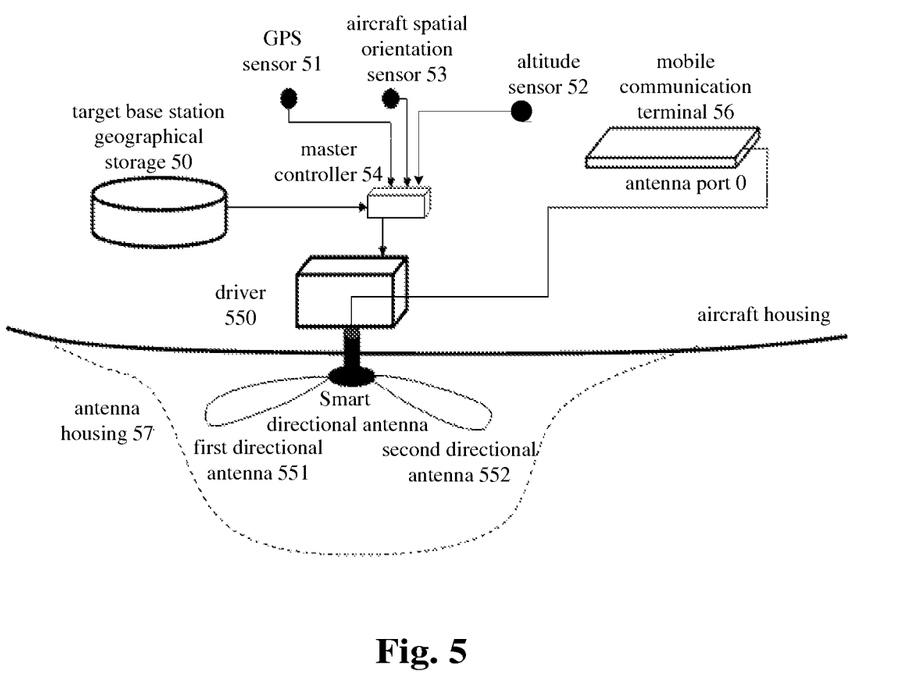
FIG. 5 is a schematic diagram of a communication antenna automatic orientation apparatus according to apparatus embodiment III of the present invention.

A communication antenna automatic orientation apparatus is provided according to the embodiments of the present invention, and FIG. 5 is a schematic diagram of a communication antenna automatic orientation apparatus according to apparatus embodiment III of the present invention, and as shown in FIG. 5, the communication antenna automatic orientation apparatus according to the embodiments of the present invention comprises: a target base station geographical storage 50 (i.e. the above best serving base station geographical storage), a sensor (including a GPS sensor 51 and an altitude sensor 52), an aircraft spatial orientation sensor 53, a master controller 54, an electrically controlled beam smart antenna orientation system (including a driver 550, a first directional antenna 551 and a second directional antenna 552), a mobile communication terminal 56, and an antenna housing 57. The communication antenna automatic orientation apparatus according to the embodiments of the present invention will be described in the following.

The target base station geographical storage 50 is used for storing the corresponding relation between the spatial location information of an aircraft on an air lane and the identifier of a target base station (i.e. the above best ground serving base station), and can also store location information of the target base station, wherein the spatial location information includes: longitude and latitude, and altitude.

The sensor, which is used for determining the current spatial location information of the aircraft, includes a GPS sensor 51 and an altitude sensor 52, wherein, the GPS sensor 51 is used for determining the current longitude and latitude of the aircraft; and the altitude sensor 52 is used for determining the current altitude of the aircraft.

The aircraft spatial orientation sensor 53 is used for determining a current spatial orientation of the aircraft;

The master controller 54 is connected to the above GPS sensor 51, altitude sensor 52 and target base station geographical storage 50 via communication lines, is used for determining the target directions of the first directional antenna 551 and second directional antenna 552 in the electrically controlled beam smart antenna orientation system according to the current spatial location information (the current longitude and latitude outputted by the GPS sensor 51 and the current altitude outputted by the altitude sensor 52), the corresponding relation (stored in the target base station geographical storage 50) and the current spatial orientation (outputted by the aircraft spatial orientation sensor 53), and sending an instruction carrying the target directions to the driver 550 in the electrically controlled beam smart antenna orientation system.

Preferably, the master controller 54 can in particular include:

an acquiring unit for acquiring an identifier of a current target base station corresponding to the current spatial location information according to the corresponding relation, acquiring location information of the current target base station according to the identifier, and acquiring location information stored for the last time of an original target base station; and a judging unit for judging whether the current target base station is the same as the original target base station.

According to the judgment result of the judging unit, there can be two situations, i.e. situation I, the current target base station and the original target base station are different; and situation H, the current target base station and the original target base station are the same. Hereinafter, the process of the master controller 54 under the above two situations will be described in detail.

Situation I

Under situation I, the following several units of the master controller 54 can perform the following process:

a first calculation unit for calculating a first target direction directing to the current target base station and a second target direction directing to the original target base station according to the location information of the current target base station, the location information of the original target base station, the current spatial location information, and the current spatial orientation in the situation that the judgment result of the judging unit is no;

a first sending unit for sending a first instruction carrying the first target direction and sending a second instruction carrying the second target direction in the situation that the judgment result of the judging unit is no; and an updating module for updating the storage information of the original target base station with the storage information of the current target base station.

Situation II

Under situation II, the following several units of the master controller 54 can perform the following process:

a second calculation unit for calculating a target direction directing to the current target base station according to the location information of the current target base station, the current spatial location information, and the current spatial orientation in the situation that the judgment result of the judging unit is yes; and a second sending unit for sending a signaling carrying the target direction in the situation that the judgment result of the judging unit is yes, so as to enable both the first directional antenna and the second directional antenna to direct to the current target base station.

The communication antenna automatic orientation apparatus according to the embodiments of the present invention further comprises:

the electrically controlled beam smart antenna orientation system, which is connected to the master controller 54, includes a driver 550, a first directional antenna 551 and a second directional antenna 552. Under situation I, the driver 550 is used for receiving a first instruction and a second instruction sent by the master controller 54 and driving the first directional antenna 551 according to the first target direction in the first instruction and driving the second directional antenna 552 according to the second target direction in the second instruction; the first directional antenna 551 is used for receiving a signal from the current target base station in the first target direction; and the second directional antenna 552 is used for receiving a signal from an original base station in the second target direction.

Under situation H, the driver 550 receives an instruction sent by the master controller 54 and drives the first directional antenna 551 and the second directional antenna 552 according to the instruction to enable both the first directional antenna 551 and the second directional antenna 552 to direct to the current target base station.

The mobile communication terminal 56 is used for processing the signals received by the first directional antenna 551 and the second directional antenna 552.

The antenna housing 57 is used for preventing the first directional antenna 551 and the second directional antenna 552 from being affected by wind resistance. The antenna housing 57 can be a streamline antenna housing, and the selection of material is required to cause very little damage to the radio frequency signals.

It needs to be noted that the details in the communication antenna automatic orientation apparatus according to the embodiments of the present invention can refer to the corresponding part in the above apparatus embodiment I, which will not be described here redundantly.

Method Embodiments

A communication antenna automatic orientation method is provided according to the embodiments of the present invention, which comprises the following process (steps S602 to S608):

Step S602: a master controller acquires current spatial location information of an aircraft and current aircraft spatial orientation information from a sensor; wherein, the current spatial location information includes: longitude and latitude, and altitude; the sensor includes: a GPS sensor and an altitude sensor.

Step S604: the master controller acquires location information of a current target base station according to the current spatial location information; and in particular, in step S604, the master controller can check a target base station geographical storage according to the current spatial location information to acquire the location information of the current target base station, wherein the target base station geographical storage is used for storing the corresponding relation between the spatial location information of an aircraft on an air lane and an identifier of a target base station.

Step S606: the master controller determines a target direction of a directional antenna according to the location information of the current target base station, the current spatial location information and the current aircraft spatial orientation information, and sends a signaling carrying the target direction to a smart directional antenna driver; and Step S608: the smart directional antenna driver drives a directional antenna according to the instruction so as to enable the directional antenna to direct to the current target base station. In particular, the smart directional antenna driver directly drives the directional antenna when the directional antenna is the electromechanical automatic directional antenna, and the smart directional antenna driver generates an antenna pattern (antenna direction diagram) to drive the directional antenna when the directional antenna is the smart antenna.

Figure 6:
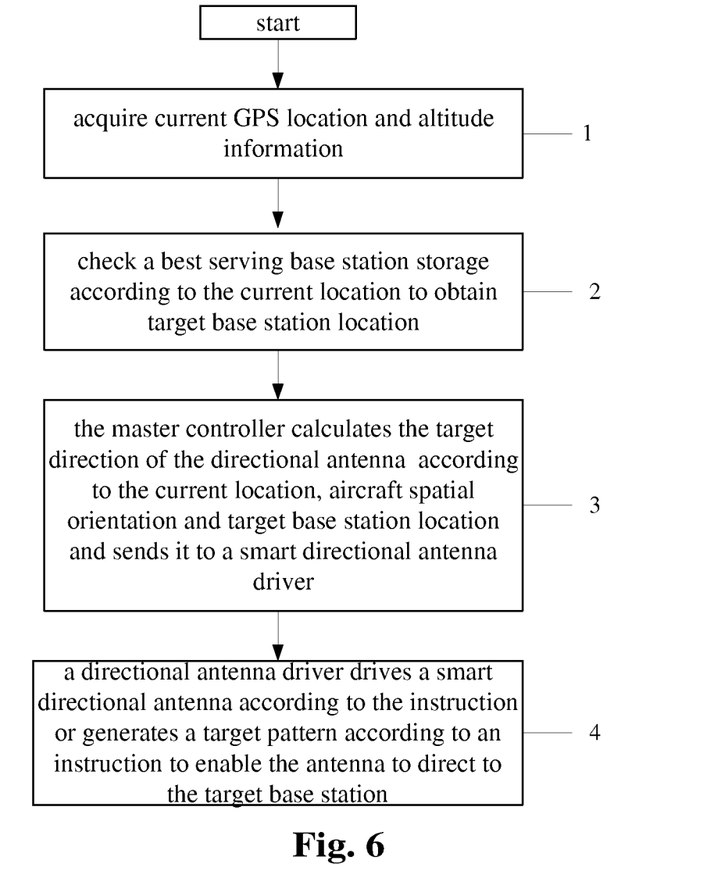
FIG. 6 is a flow chart of a communication antenna automatic orientation method according to the method embodiments of the present invention.

FIG. 6 is a flow chart of a communication antenna automatic orientation method according to the method embodiments of the present invention, and as shown in FIG. 6, this method comprises the following process:

1. a master controller acquires current GPS location and altitude information from a sensor;

2. the master controller checks a best serving base station storage according to the current body (aircraft) spatial location information to obtain the location of the target base station;

3. the master controller calculates a target direction of the directional antenna according to the current location, aircraft spatial orientation and target base station location and sends it to a smart directional antenna driver; and 4. the directional antenna driver driving the directional antenna according to the instruction if it is electromechanical or generates an antenna pattern according to the instruction if it is beam controlled to enable the directional antenna to direct to the target base station.

It needs to be noted that when the aircraft flies normally, the basic steps of achieving the automatic adjustment of the directional antenna direction can be processed according to the above steps, and since the location of the aircraft changes all the time, the above steps need to be performed circularly and periodically.

When the aircraft cross the borders covered by different base stations, i.e. when the best serving station (target base station) changes, if an apparatus (i.e. including a set of directional antenna and a set of wide aperture antenna) in apparatus embodiment I as shown in FIG. 2 is used, then it is unnecessary to perform specific process; and if an apparatus which is composed of two sets of directional antennas in apparatus embodiment II (FIG. 4) is used or an apparatus which is composed of a set of electrically controlled beam smart antenna is used (FIG. 5), then it is needed to perform handoff process, wherein the handoff process includes the following operations:

after the master controller acquires the location information of the current target base station according to the current spatial location information, it further needs to judge whether the current target base station and the stored original target base station are the same.

In the situation that the master controller judges that the current target base station and the stored original target base station are different, the master controller determines a first target direction directing to the current target base station and a second target direction directing to the original target base station according to the location information of the current target base station, the location information of the original target base station, the current spatial location information and the current aircraft spatial orientation information; and then, the master controller makes the first target direction carried in a first signaling and sends the first signaling to a first smart directional antenna driver, and makes the second target direction carried in a second signaling and sends the second signaling to a second smart directional antenna driver.

The first smart directional antenna driver drives the first directional antenna to enable the first directional antenna to direct to the current target base station; and the second smart directional antenna driver drives the second directional antenna to enable the second directional antenna to direct to the original target base station.

After the smart directional antenna driver drives the directional antenna according to the instruction, the master controller needs to update the storage information of the original target base station with the storage information of the current target base station.

Figure 7:
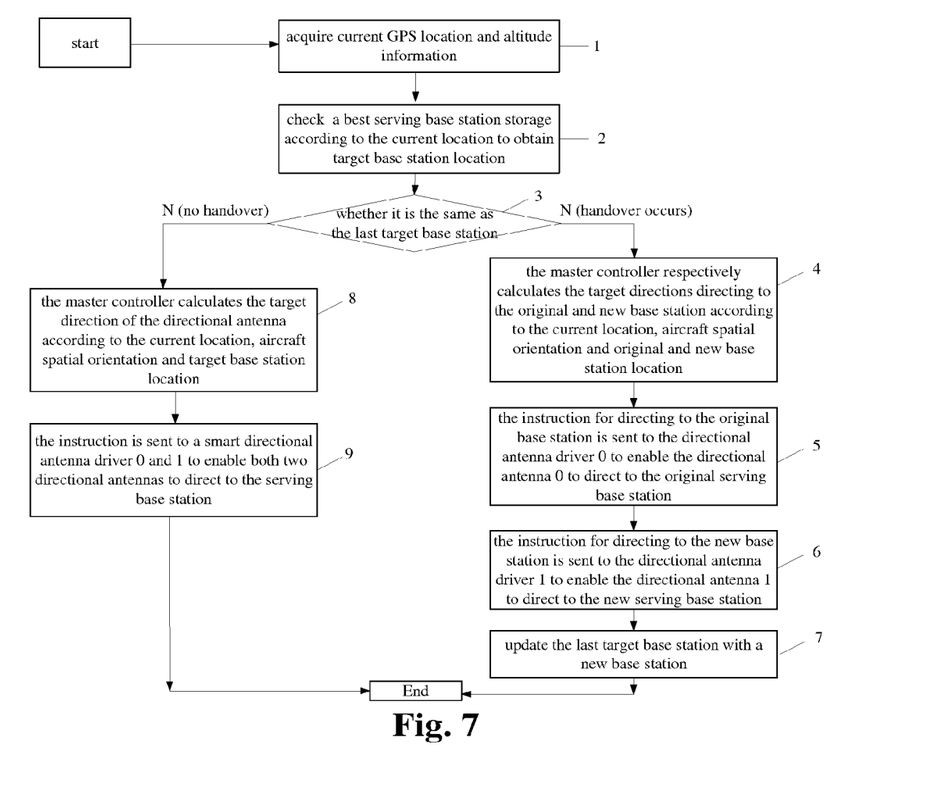
FIG. 7 is a flow chart of the handoff process of a communication antenna automatic orientation method according to the method embodiments of the present invention.

Hereinafter, the above technical solution of the present invention will be described in conjunction with drawings. FIG. 7 is a flow chart of the handoff process of a communication antenna automatic orientation method according to the method embodiments of the present invention, and as shown in FIG. 7, the following processes are included:

1. a master controller acquires current GPS location and altitude information from a sensor, 2. the master controller checks a best serving base station storage according to the current body (aircraft) spatial location information to obtain the location of the target base station;

3. the master controller judges whether the target base station and the last (the last time) stored target base station are the same.

4. if they are different, then it indicates that the border of the base station service area has been crossed and the steps 5 to 7 is automatically performed;

5. in order to keep the stability of communication quality during handoff, it needs to control two sets of directional antennas (or a set of smart antennae and two directional beams) to respectively direct to the new and old base stations; and the master controller calculates the target directions of the original base station and the new base station according to the current location, the aircraft spatial orientation, and the locations of the original base station and the new base station;

6. an instruction for directing to the original base station is sent to a directional antenna driver 0 to enable a directional antenna 0 (or directional beam 0) to direct to the original serving base station; and an instruction for directing to the new base station is sent to a directional antenna driver 1 to enable a directional antenna 1 (or directional beam 1) to direct to the new serving base station;

7. the storage information of the last target base station storage information is updated with the storage information of the new base station;

as to the above step 3, if the target base station and the last stored target base station are the same, then it indicates that no handoff of serving base station occur and the conventional operations can be performed, i.e. performing steps 8 to 9;

8. the master controller calculates a target direction of the directional antenna according to the current location, aircraft spatial orientation and target base station location; and 9. the master controller sends an instruction to the smart directional antenna drivers 0 and 1 to enable these two directional antennas to direct to the serving base station.

In summary, both the control modes as shown in FIGS. 6 and 7 are one period of periodical circulation, wherein the initial period can be set as 1 s to 3 s, and the period time can be optimized according to the test result to meet the location accuracy.

The 1xEV-DO mobile communication terminal has two antenna ports, and it is required that the signals received by any one of antennas meet the quality, and the irrelevance between the signals of two antennas will also generate diversity receiving gain. This characteristic provides advantages for the present invention to ensure the stability of communication quality and for the solution to solve the handoff of the directional antenna between serving base stations. The handoff control mode shown in FIG. 7 can ensure two directional antennas to respectively direct to the new base station and the old base station at the first execution period after the aircraft crosses the coverage border of the base station, and during this execution period, there is already enough time to enable to mobile terminal to complete soft handoff and forward virtual soft handoff. Of course, the time of this handoff period can be optimized according to the test situation, which is totally in the control range of the master controller. At the second execution period after crossing the border, the directional antenna direction which directs to the old base station will switch to direct to the new base station, then both of these two directional antennas direct to the new base station.

By improving the signal to noise ratio of the forward wireless link, the present solution enables to significantly increase the data throughput or subscriber capacity of cellular mobile communication. To take a simple example to describe the following, at the location the distances between which and three surrounding base stations are equal, when using an omnidirectional antenna, the signal to noise ratio of the forward link is generally between −5 dB to −3 dB, as to the CDMA system, it is of course under the soft handoff state, and the forward DRC rate of the corresponding cdma 1x EV-DO system is about 153.6 kbps; and after using a directional antenna with 7 dBi gain (front-to-rear ratio is generally greater than 15), the signal restraint degree for two adjacent base stations can be up to −7 dB while increasing the master base station signal by 7 dB, then it is predicted that the signal to noise ratio of the forward link can be increased to be above 5 dB, which makes it be in non handoff state, and the corresponding forward DRC rate is not lower than 921 kbps. It can be seen that the signal quality and throughput are improved significantly.

In summary, by way of the technical solution of the present invention, the problem in relevant art that the mobile communication terminal antennae installed on the aircraft are limited regarding signal quality, capacity and coverage of the system, and the application of high speed packet data service is solved by proposing a communication antenna automatic orientation apparatus and method suitable for aircrafts to cooperate with the cellular mobile communication systems consisted of ground stations for operations, which can improve user communication quality, improve service data rate and system capacity, and also can enlarge the coverage radius of the ground base station and at the same time ensure the reliability of the handoff between service areas.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A communication antenna automatic orientation apparatus, comprising:

a target base station geographical storage for storing corresponding relation between spatial location information of an aircraft on an air lane and an identifier of a target base station, wherein said spatial location information includes: longitude and latitude, and altitude;

a sensor for determining current spatial location information of said aircraft;

an aircraft spatial orientation sensor for determining a current spatial orientation of the aircraft;

a master controller for determining a target direction of a directional antenna according said current spatial location information, said corresponding relation and said current spatial orientation and sending an instruction carrying said target direction;

a first automatic antenna orientation system for receiving said instruction and driving a first directional antenna according to said target direction in said instruction so as to enable said first directional antenna to receive a signal from a ground base station in said target direction;

a second automatic antenna orientation system for receiving said instruction and driving a second directional antenna according to said target direction in said instruction so as to enable said second directional antenna to receive a signal from a ground base station in said target direction; and
a mobile communication terminal for processing the signals received by said first directional antenna and said second directional antenna.

2. The apparatus according to claim 1, wherein said sensor further comprises:
a GPS sensor for determining a current longitude and latitude of said aircraft; and
an altitude sensor for determining a current altitude of said aircraft.

3. The apparatus according to claim 1, wherein said target base station geographical storage is further used for: storing location information of said target base station.

4. The apparatus according to claim 3, wherein said master controller comprises:
an acquiring unit for acquiring the identifier of a current target base station corresponding to said current spatial location information according to said corresponding relation, acquiring location information of said current target base station according to said identifier, and acquiring location information, stored for the last time, of an original target base station; and
a judging unit for judging whether the current target base station is the same as said original target base station.

5. The apparatus according to claim 4, wherein said master controller further comprises:
a first calculation unit for calculating a first target direction directing to said current target base station and a second target direction directing to said original target base station according to the location information of said current target base station, the location information of said original target base station, said current spatial location information and said current spatial orientation, in the situation that the judgment result of said judging unit is no;
a first sending unit for sending a first instruction carrying said first target direction and sending a second instruction carrying said second target direction in the situation that the judgment result of said judging unit is no; and
an updating module for updating the storage information of said original target base station with the storage information of said current target base station.

6. The apparatus according to claim 5, wherein said first automatic antenna orientation system comprises:
a first driver for driving said first directional antenna according to said first target direction in said first instruction; and
said first directional antenna for receiving a signal from said current target base station in said first target direction.

7. The apparatus according to claim 5, wherein said second automatic antenna orientation system comprises:
a second driver for driving said second directional antenna according to said second target direction in said second instruction; and
said second directional antenna for receiving a signal from said original target base station in said second target direction.

8. The apparatus according to claim 4, wherein said master controller further comprises:
a second calculation unit for calculating a target direction directing to said current target base station according to the location information of said current target base station, said current spatial location information and said current spatial orientation, in the situation that the judgment result of said judging unit is yes; and
a second sending unit for sending said target direction to said first automatic antenna orientation system and said second automatic antenna orientation system via a signaling in the situation that the judgment result of said judging unit is yes so as to enable both said first directional antenna and said second directional antenna to direct to said current target base station.

9. The apparatus according to claim 6, wherein said first directional antenna or said second directional antenna is one of the following: a smart antenna electrically controlling an antenna pattern via an array antenna and an electromechanical automatic directional antenna.

10. The apparatus according to claim 9, wherein
said first driver is used for: driving said first directional antenna when said first directional antenna is said electromechanical automatic directional antenna and generating an antenna pattern to drive said first directional antenna when said first directional antenna is said smart antenna; and
said second driver is used for: driving said second directional antenna when said second directional antenna is said electromechanical automatic directional antenna and generating an antenna pattern to drive said second directional antenna when said second directional antenna is said smart antenna.

11. The apparatus according to claim 1, wherein said apparatus further comprises:
an antenna housing for preventing said first directional antenna and said second directional antenna from being affected by wind resistance.

12. A communication antenna automatic orientation apparatus, comprising:
a target base station geographical storage for storing corresponding relation between spatial location information of an aircraft on an air lane and an identifier of a target base station, wherein said spatial location information includes: longitude and latitude, and altitude;
a sensor for determining current spatial location information of said aircraft;
an aircraft spatial orientation sensor for determining a current spatial orientation of the aircraft;
a master controller for determining a target direction of a directional antenna according to said current spatial location information, said corresponding relation and said current spatial orientation and sending an instruction carrying said target direction;
an electrically controlled beam smart antenna orientation system for receiving said instruction and driving a directional antenna thereof according to said target direction so as to enable said directional antenna to receive a signal from a ground base station in said target direction; and
a mobile communication terminal for processing the signal received by said directional antenna.

13. The apparatus according to claim 12, wherein said sensor further comprises:
a GPS sensor for determining a current longitude and latitude of said aircraft; and
an altitude sensor for determining a current altitude of said aircraft.

14. The apparatus according to claim 12, wherein said target base station geographical storage is further used for: storing location information of said target base station.

15. The apparatus according to claim 14, wherein said master controller comprises:

an acquiring unit for acquiring the identifier of a current target base station corresponding to said current spatial location information according to said corresponding relation, acquiring location information of said current target base station according to said identifier, and acquiring location information, stored for the last time, of an original target base station; and a judging unit for judging whether the current target base station is the same as said original target base station.

16. The apparatus according to claim 15, wherein said master controller further comprises:

a first calculation unit for calculating a first target direction directing to said current target base station and a second target direction directing to said original target base station according to the location information of said current target base station, the location information of said original target base station, said current spatial location information and said current spatial orientation, in the situation that the judgment result of said judging unit is no;

a first sending unit for sending a first instruction carrying said first target direction and sending a second instruction carrying said second target direction in the situation that the judgment result of said judging unit is no; and an updating module for updating the storage information of said original target base station with the storage information of said current target base station.

17. The apparatus according to claim 16, wherein said electrically controlled beam smart antenna orientation system comprises:

a driver for driving a first directional antenna according to said first target direction in said first instruction and driving a second directional antenna according to said second target direction in said second instruction;

said first directional antenna for receiving a signal from said current target base station in said first target direction; and said second directional antenna for receiving a signal from said original base station in said second target direction.

18. The apparatus according to claim 15, wherein said master controller further comprises:

a second calculation unit for calculating a target direction directing to said current target base station according to the location information of said current target base station, said current spatial location information and said current spatial orientation, in the situation that the judgment result of said judging unit is yes; and a second sending unit for sending a signaling carrying said target direction in the situation that the judgment result of said judging unit is yes, so as to enable both said first directional antenna and said second directional antenna to direct to said current target base station.

19. The apparatus according to claim 12, wherein said apparatus further comprises:

an antenna housing for preventing said first directional antenna and said second directional antenna from being affected by wind resistance.

20. A communication antenna automatic orientation method, comprising:

acquiring from a sensor current spatial location information of an aircraft and current aircraft spatial orientation information, by a master controller;

acquiring location information of a current target base station by said master controller according to said current spatial location information;

determining by said master controller a target direction of a directional antenna, according to the location information of said current target base station, said current spatial location information and said current aircraft spatial orientation information, and sending a signaling carrying said target direction to a smart directional antenna driver; and driving by said smart directional antenna driver a directional antenna according to said signaling so as to enable said directional antenna to direct to said current target base station.

21. The method according to claim 20, wherein said current spatial location information comprises: longitude and latitude, and altitude.

22. The method according to claim 20, wherein said sensor comprises:

a GPS sensor and an altitude sensor.

23. The method according to claim 20, wherein the step of acquiring the location information of said current target base station by said master controller according to said current spatial location information comprises:

checking by said master controller a target base station geographical storage according to said current spatial location information to acquire the location information of said current target base station, wherein said target base station geographical storage is used for storing the corresponding relation between the spatial location information of an aircraft on an air lane and an identifier of a target base station.

24. The method according to claim 23, wherein the step of driving a directional antenna by said smart directional antenna driver according to said instruction comprises:

directly driving said directional antenna by said smart directional antenna driver when said directional antenna is said electromechanical automatic directional antenna, and generating an antenna pattern by said smart directional antenna driver to drive said directional antenna when said directional antenna is said smart antenna.

25. The method according to claim 20, wherein in the situation that said target base station changes, said method after said master controller acquires the location information of a current target base station according to said current spatial location information, further comprises:

judging by said master controller whether said current target base station is the same as the stored original target base station.

26. The method according to claim 25, wherein in the situation that the master controller judges that said current target base station is different from the stored original target base station, the step of said master controller determining a target direction of a directional antenna and sending a signaling carrying said target direction to a smart directional antenna driver comprises:

determining by said master controller a first target direction directing to said current target base station and a second target direction directing to said original target base station, according to the location information of said current target base station, the location information of said original target base station, said current spatial location information and said current aircraft spatial orientation information; and said master controller making said first target direction carried in a first signaling and sending the first signaling to a first smart directional antenna driver, and making said second target direction carried in a second signaling and sending the second signaling to a second smart directional antenna driver.

27. The method according to claim 26, wherein the step of driving a directional antenna by said smart directional antenna driver according to said instruction so as to enable said directional antenna to direct to said current target base station comprises:

driving by said first smart directional antenna driver a first directional antenna so as to enable said first directional antenna to direct to said current target base station; and     driving by said second smart directional antenna driver a second directional antenna so as to enable said second directional antenna to direct to said original target base station.

28. The method according to claim 27, wherein after said smart directional antenna driver drives a directional antenna according to said instruction, said method further comprises:

updating by said master controller the storage information of said original target base station with the storage information of said current target base station.

29. The apparatus according to claim 7, wherein said first directional antenna or said second directional antenna is one of the following: a smart antenna electrically controlling an antenna pattern via an array antenna and an electromechanical automatic directional antenna.

\* \* \* \* \*